United States Patent
Takayanagi et al.

(10) Patent No.: US 6,540,243 B2
(45) Date of Patent: Apr. 1, 2003

(54) FRONT WHEEL STEERING SYSTEM FOR AUTOMOTIVE THREE- AND FOUR-WHEELED VEHICLES

(75) Inventors: Shinji Takayanagi, Saitama (JP); Takashi Ozeki, Saitama (JP); Shinji Furuta, Saitama (JP); Hiroyoshi Kobayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/981,921

(22) Filed: Oct. 19, 2001

(65) Prior Publication Data

US 2002/0046896 A1 Apr. 25, 2002

(30) Foreign Application Priority Data

Oct. 20, 2000 (JP) ........................................ 2000-320649

(51) Int. Cl.[7] ................................................. B62D 5/99
(52) U.S. Cl. ..................................... 280/93.51; 280/778
(58) Field of Search ............................... 280/93.51, 778, 280/276, 277

(56) References Cited

U.S. PATENT DOCUMENTS

| | | | |
|---|---|---|---|
| 1,418,679 A | | 6/1922 | Schipper |
| 2,638,356 A | * | 5/1953 | Butterfield et al. ... 280/124.153 |
| 3,768,825 A | * | 10/1973 | Magnusson .......... 280/124.109 |
| 3,866,946 A | | 2/1975 | Robison |
| 4,749,205 A | | 6/1988 | Takahashi et al. |
| 6,349,966 B1 | * | 2/2002 | Hutter et al. ................ 280/771 |

FOREIGN PATENT DOCUMENTS

| | | |
|---|---|---|
| DE | 37 28 593 A1 | 3/1989 |
| FR | 2 491 650 | 4/1982 |
| JP | 6-115442 | 4/1994 |

OTHER PUBLICATIONS

Patent Abstracts of Japan for JP 2000–309280, vol. 2000, No. 14, Mar. 5, 2001.

* cited by examiner

*Primary Examiner*—Lesley D. Morris
*Assistant Examiner*—L. Lum
(74) *Attorney, Agent, or Firm*—Birch, Stewart, Kolasch, Birch, LLP

(57) ABSTRACT

To reduce the cost of a front wheel steering system for automotive three- and four-wheeled vehicles by utilizing a steering angle ratio varying means having a simple construction. In a front wheel steering system for automotive four-wheeled vehicles, a steering shaft rotatably mounted to a head pipe steers the right and left front wheels. The steering stem is disposed below the steering shaft offset from the steering shaft. The steering stem is connected to the steering shaft via a link mechanism. The right and left front wheels are connected to the steering stem via a tie rod. The link mechanism includes an upper link, a lower link, and a universal coupling connecting the upper link and the lower link. The steering shaft is disposed at the midsection between the steering stem and the universal coupling when the link mechanism is viewed in the direction of the axis of the steering shaft.

15 Claims, 12 Drawing Sheets

FRONT WHEEL STEERING SYSTEM FOR AUTOMOTIVE THREE- AND FOUR-WHEELED VEHICLES

CROSS-REFERENCE TO RELATED APPLICATIONS

This nonprovisional application claims priority under 35 U.S.C. § 119(a) on Patent Application No. 2000-320649 filed in Japan on Oct. 20, 2000, the entirety of which is herein incorporated by reference.

BACKGROUND OF THE INVENTION

1. Field of the Invention

The present invention relates to a front wheel steering system for automotive three- and four-wheeled vehicles for steering right and left front wheels.

2. Description of the Background Art

Automotive three-wheeled vehicles or four-wheeled vehicles have a front wheel steering system in which the proportion of the steered angle of the front wheel is variable with respect to the steering angle of the steering handle. One of the known front wheel steering systems of this type is, for example, presented in Japanese Unexamined Patent Application Publication No. 0115442/1994 (hereinafter referred to as a background art), and entitled "RUDDER ANGLE RATIO VARYING APPARATUS".

Referring to FIGS. 1 and 2 of the above reference, the background art is constructed in such a manner that by steering the steering wheel 4 (the reference numbers cited herein correspond to those in the above reference), the steering force is transmitted to the steered wheel 30 through the steering shaft 3, the ball screw mechanism 12, the conversion nut member 7, the arm 17, the lever member 16, the cylindrical portion 19, the shaft portion 18, the first gear 21, the second gear 26, the pinion 27, the rack gear 29, the rack shaft 28, the tie rod, and the knuckle arm to rotate the steered wheel 30.

In the background art described above, as shown in FIGS. 4 and 9, the first gear 21 and the second gear 26 are elliptic gears. The steering angle ratio varying means comprises first and second gears 21, 26 having a non-linear steering angle ratio in which the steered angle of the steered wheel 30 is small in the region where the steering angle of the steering wheel 4 is small. The steered angle increases with the steering angle.

In the background art described above, the first and second gears 21, 26 constituting steering angle ratio varying means are elliptic gears having a complex configuration, which may increase the cost. In addition, in order to ensure a further stable operation of the steering angle ratio varying means, preferably, the steering angle ratio varying means is stored in a case 1. The case 1 is utilized to ensure that the input and output portions of the steering angle ratio varying means is properly sealed. Accordingly, the employment of the elliptic gear in the background art may cause an increase in the cost of the steering angle ratio varying apparatus.

SUMMARY OF THE INVENTION

Accordingly, an object of the present invention is to simplify the construction of a steering angle ratio varying means in order to decrease the cost of a front wheel steering system for automotive three- and four-wheeled vehicles.

In order to achieve the object described above, according to a first aspect of the present invention a front wheel steering system for automotive three- and four-wheeled vehicles has right and left front wheels controlled by a steering shaft rotatably mounted on the head pipe of the vehicle body frame. The steering stem is disposed below the steering shaft at a location offset from the steering shaft. The steering stem is connected to the steering shaft via a link mechanism. The right and left front wheels are connected to the steering stem via the right and left tie rods and the right and left knuckle arms. The link mechanism is constructed from an upper link, a lower link, and a universal coupling for coupling the upper link and the lower link. Accordingly, so the steering shaft is disposed between the steering stem and the universal coupling when the link mechanism is viewed in the axial direction of the steering shaft.

When the link mechanism is viewed in the axial direction of the steering shaft, when the steering angle of the steering shaft is zero, the center of the steering shaft, the universal coupling, and the center of the steering stem are aligned. When viewed from the side of the vehicle body in a direction at a right angle with this line, the proportion of the distance from the universal coupling to the center of the steering stem with respect to the distance from the center of the steering shaft to the universal coupling varies in accordance with the steering angle of the steering shaft. Consequently, the proportion of the steered angle of the front wheel with respect to the steering angle of the steering shaft (steering angle ratio) varies in accordance with the steering angle of the steering shaft. In this way, the link mechanism functions to vary the steering angle ratio. This is referred to as a steering angle ratio varying function. Since the mechanism performing the steering angle ratio varying action is a link mechanism, an extremely simple construction may be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
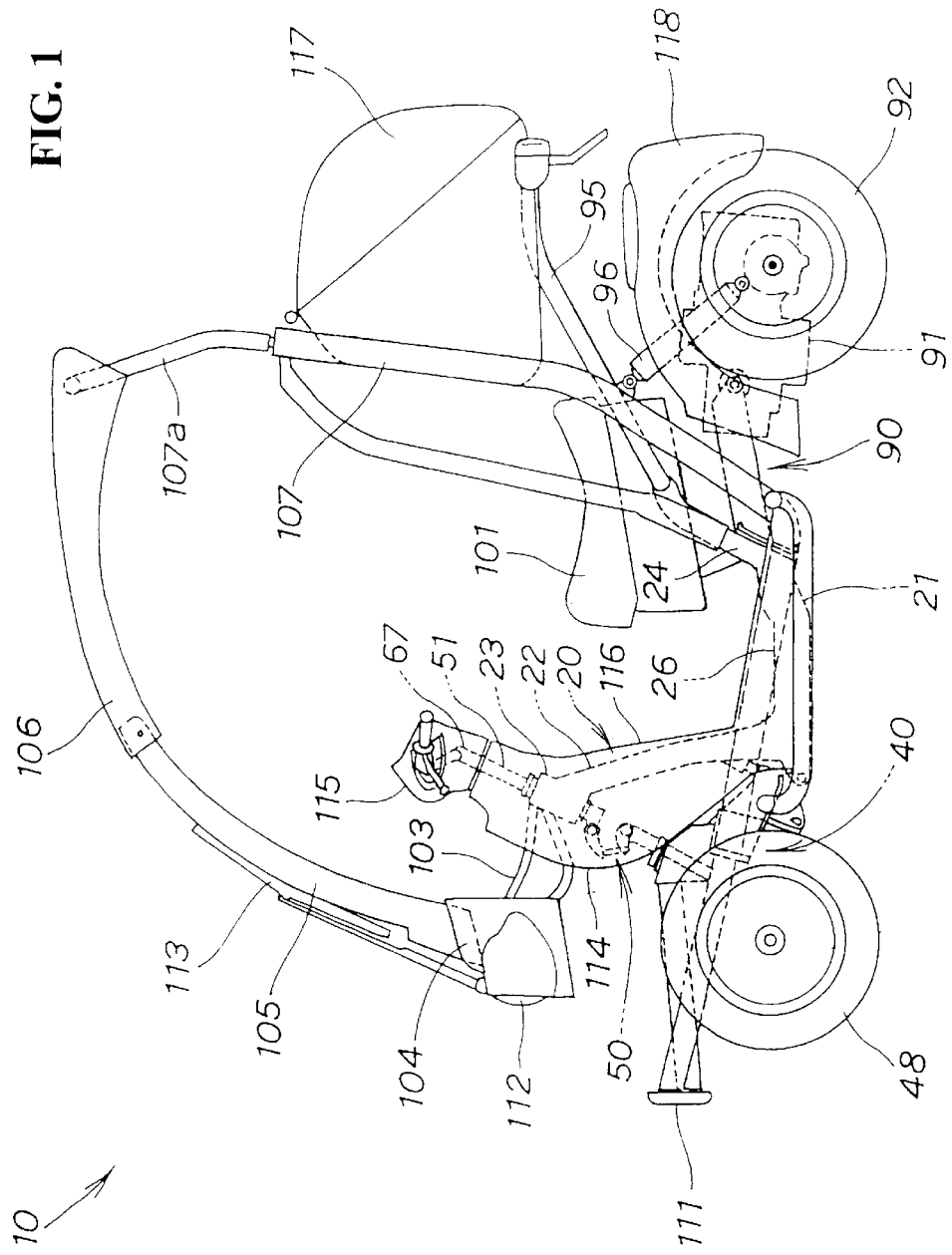
FIG. 1 a left side view of an automotive four-wheeled vehicle according to the present invention.

An embodiment of the present invention will now be described with reference to the accompanying drawings. It should be noted that the terms "front", "rear", "left", "right", "upper", and "lower" relate to directions as viewed from the driver of the vehicle. In addition, the figures should be viewed so that the reference numerals are in the proper orientation.

FIG. 1 is a left side view of an automotive four-wheeled vehicle according to the present invention.

An automotive four-wheeled vehicle 10 is a scooter type automotive four-wheeled vehicle constructed with a generally horizontal low foot deck 26 mounted on the middle upper portion of the vehicle body frame 20. A front wheel suspension 40 and a front wheel steering system 50 are mounted on the front portion of the vehicle body frame 20. A rear wheel suspension 90 is mounted on the rear portion of the vehicle body frame 20. Furthermore, a seat 101 is mounted on the rear upper portion of the vehicle body frame 20.

The rear suspension 90 is constructed in such a manner that the swinging power unit 91 is connected to the rear frame portion 24 so as to be capable of rolling in an upward and downward swinging motion. The rear wheels 92 are rotatably mounted to the power unit 91. The term "rolling" refers to rotational movement of the power unit 91 about the longitudinal center of the vehicle body of the automotive four-wheeled vehicle 10 (along the center of the width direction of the vehicle) with respect to the vehicle body frame 20. The power unit 91 comprises an engine, and a transmitting mechanism for transmitting the power of the engine to the rear wheels 92 integrated together as a single unit.

The rear frame portion 24 is constructed of a rear frame 95 extending in the upper rear direction. The rear portion of the power unit 91 is suspended to the rear frame 95 via the rear damper 96.

The automotive four-wheeled vehicle 10 also includes a screen garnish 104 mounted on the front portion of the head pipe 23 via a stay 103. A wind screen 105 extends upward from the screen garnish 104. The front end of the roof 106 is mounted on the upper end of the wind screen 105. A roof supporting stud, or a pillar 107 extends upward from the rear portion of the vehicle body frame 20. Furthermore, the rear end portion of the roof 106 is mounted on the supporting portion 107a at the upper end of the pillar 107.

In FIG. 1, the reference numeral 111 designates a bumper, 112 designates a head lamp, 113 designates a wiper, 114 designates a front cover, 115 designates a handle cover, 116 designates a leg shield for covering the legs of the driver, 117 designates a storage box, and 118 designates a rear cover.

Figure 2:
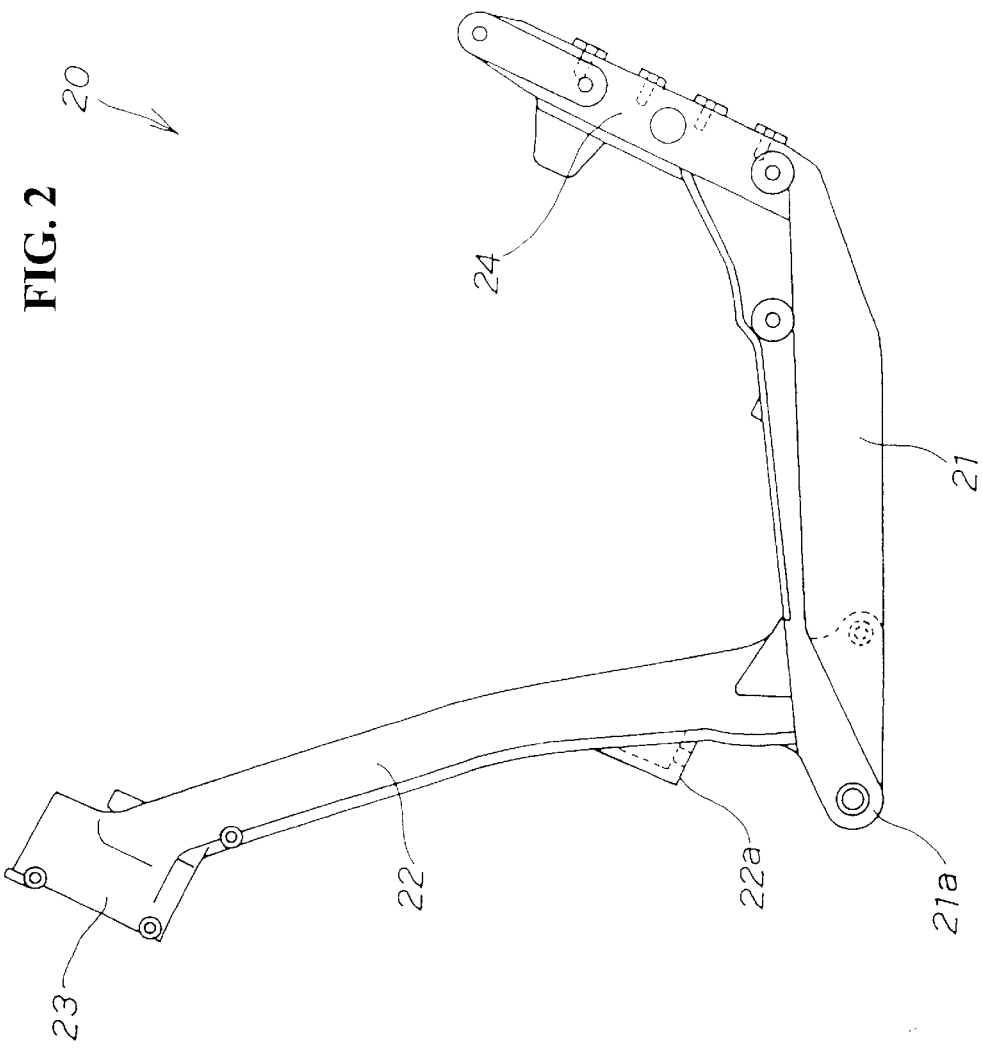
FIG. 2 is a left side view of a vehicle body frame according to the present invention.

FIG. 2 is a left side view of the vehicle body frame according to the present invention.

The vehicle frame 20 is a casting formed of an aluminum alloy. The vehicle frame 20 includes a center frame portion 21 of generally horizontal frame body construction. A front frame portion (head pipe post) 22 extends upward from the front portion of the center frame portion 21. The head pipe 23 is provided at the tip of the front frame portion 22. The rear frame portion 24 extends upward from the rear portion of the center frame portion 21. The center frame portion 21 serves to support the foot deck 26 (see FIG. 1).

Figure 3:
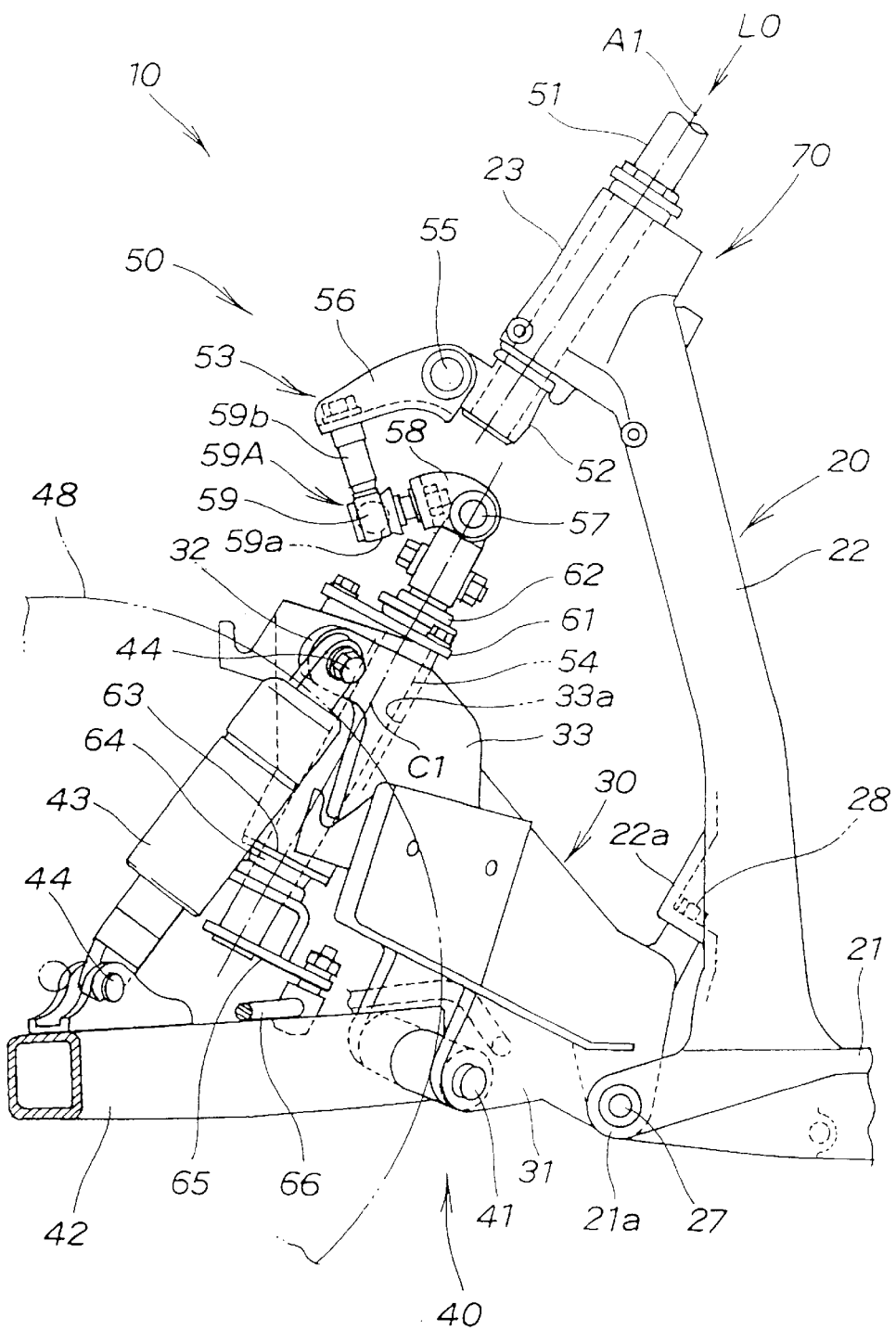
FIG. 3 is a left side view of a front portion of an automotive four-wheeled vehicle according to the present invention.

FIG. 3 is a left side view of the front portion of the automotive four-wheeled vehicle according to the present invention showing the front portion of a vehicle body frame 20, a front wheel suspension 40, and a front wheel steering system 50.

The vehicle body frame 20 is assembled by detachably mounting the rear portion of the front frame 30 to the front mounting portion 21a of the front portion of the center frame portion 21 and the front mounting portion 22a of the front portion of the front frame portion 22 by means of screw bolts 27, 28.

The front frame 30 is an integral molding comprising an arm mounting portion 31, a damper connecting portion 32 and a steering support 33.

The front wheel suspension 40 is assembled by mounting a swing arm 42 to the arm mounting portion 31 of the front frame 30 by means of a pivot shaft 41 so as to be capable of upward and downward swinging motion. The swing arm 42 is suspended from the damper connecting portion 32 of the front frame 30 by means of a front damper 43. The reference numerals 44, 44 designate damper connecting screw bolts.

The front wheel steering system 50 is exemplified by constructions (1) and (2) described as follows:

The construction (1) includes the steering shaft 51 mounted to the head pipe 23 so as to be cable of rotation but not axial movement. The steering stem 54, which is a different member from the steering shaft 51 (the second steering shaft) is connected to the connecting member 52 located at the lower end of the steering shaft 51 via a link mechanism 53; and The construction (2) includes the head pipe 23 provided with a steering adjusting mechanism 70 for shifting the centerline A1 of the steering shaft 51 with respect to the centerline of the head pipe 23. The steering adjusting mechanism 70 will be described later.

The link mechanism 53 is formed in an angular C-shape that can be bent freely in the vertical direction. The connecting portion 59A linking between the upper and lower links 56, 58 or the universal coupling 59 faces toward the front.

More specifically, the link mechanism 53 three main elements. First, an upper link 56 is connected at one end to the connecting member 52 of the steering shaft 51 by means of a first connecting pin 55 so as to be capable of upward and downward swinging motion. Second, a lower link 58 is connected at one end to the upper end of the steering stem 54 by means of a second connecting pin 57 so as to be capable of upward and downward swinging motion. Third, a universal coupling 59 connects the opposing ends of the upper and lower links 56, 58, or between intermediate portions of the upper and lower links 56, 58 so as to be capable of upward and downward swinging motion. The universal coupling 59 is, for example, a ball joint. The reference numeral 59a designates a ball for the ball joint, and the reference numeral 59b is a connecting arm of the ball joint.

In such a front wheel steering system 50, the steering stem 54 is disposed at a location offset in a rearward direction from the steering shaft 51. The steering shaft 51 is disposed between the steering stem 54 and the universal coupling 59 when the link mechanism 53 is viewed in the direction of the axis of the steering shaft, or in the direction shown by the arrow LO in FIG. 3.

The steering support 33 is formed by a through hole 33a that extends in the vertical direction therethrough for allowing the steering stem 54 to pass.

The front frame 30 is constructed in such a manner that the top plate 61 and the bottom plate 63 are mounted on the top and bottom of the steering support 33. The top plate 61 includes a first bearing 62. The bottom plate 63 includes a second bearing 64. With the above construction, the front frame 30 can support the steering stem 54 via the first and the second bearings 62, 64 so as to be capable of rotation but not axial movement.

Figure 4:
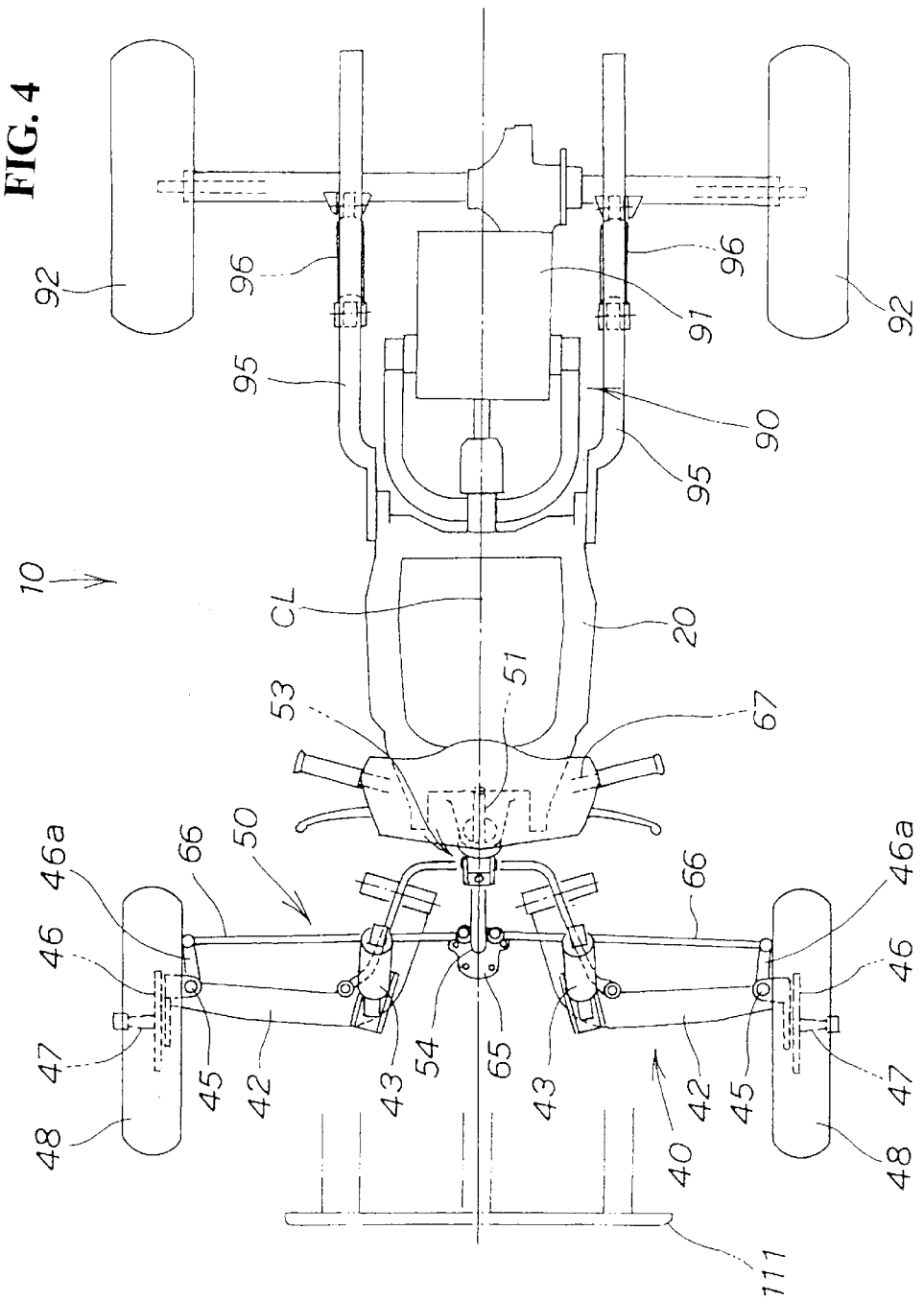
FIG. 4 is a plan view showing a principal portion of an automotive four-wheeled vehicle according to the present invention.

FIG. 4 is a plan view of the principal portion of the automotive four-wheeled vehicle according to the present invention showing an automotive four-wheeled vehicle 10 comprising two right and left front wheels 48, 48 and two right and left rear wheels 92, 92. In order to facilitate understanding of the description, the seat 101 and the roof 106 shown in FIG. 1, and the front frame 30 shown in FIG. 3 have been removed.

The front wheel suspension 40 is constructed in such a manner that the wheel shaft holder blocks 46, 46 are mounted to tip portions of the right and left swing arms 42, 42 by means of king pins 45, 45 so as to be capable of rightward and leftward swinging motion. The front wheels 48, 48 are mounted to the wheel shaft holder blocks 46, 46 by means of wheel shafts 47, 47 so as to be capable of rotation.

It should be noted that the steering system of the automotive four-wheeled vehicle 10 is, for example, an Ackerman steering (Ackerman link mechanism).

More specifically, the front wheel steering system 50 is constructed in such a manner that the left and right tie rods 66, 66 are connected to the lower end of the steering stem 54 via the rod connecting portion 65. The knuckle arms 46a, 46a of the vehicle shaft holder blocks 46, 46 are connected to the tip of the tie rods 66, 66.

Figure 5:
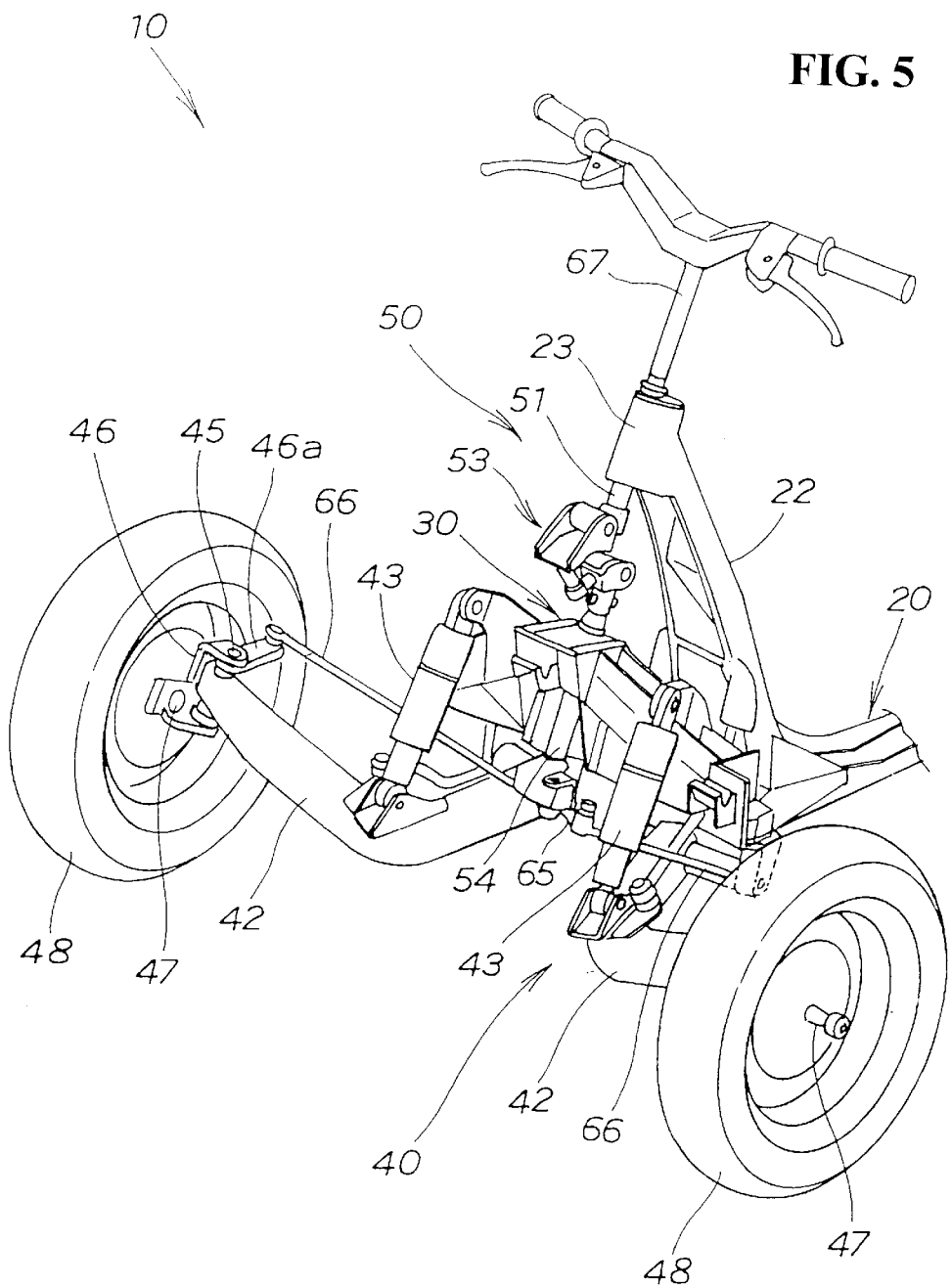
FIG. 5 is a perspective view of principal portion of the front portion of an automotive four-wheeled vehicle according to the present invention.

FIG. 5 is a perspective view of a principal portion of the front portion of the automotive four-wheeled vehicle according to the present invention showing the front wheel suspension 40 and the front wheel steering system 50.

The steering handle 67 mounted to the upper end of the steering shaft 51 includes a handle bar mounted to an upper end thereof. By steering the steering handle 67, the front wheels 48, 48 can be rotated via the steering shaft 51, the link mechanism 53, and the steering stem 54. It should be noted that a steering wheel, instead of a handle bar, could be used with the steering handle 67.

Figure 6A:
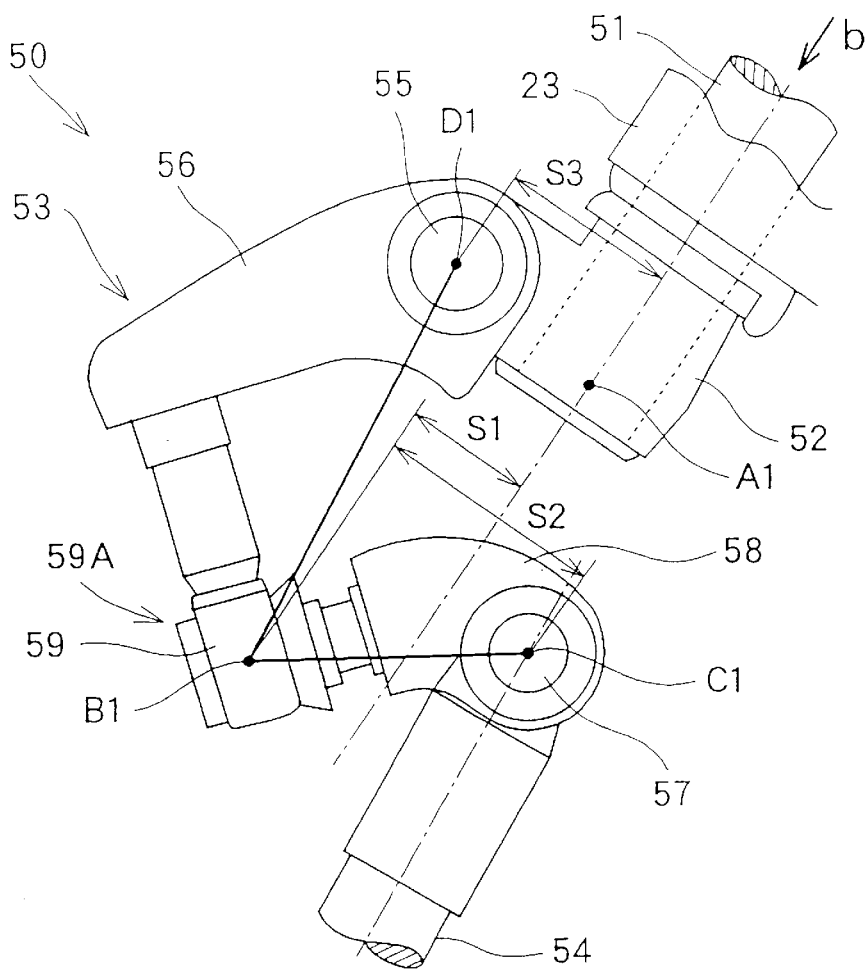
FIG. 6(a) is a block diagram and FIG. 6(b) is an operation diagram of a front wheel steering system according to the present invention.
Figure 6B:
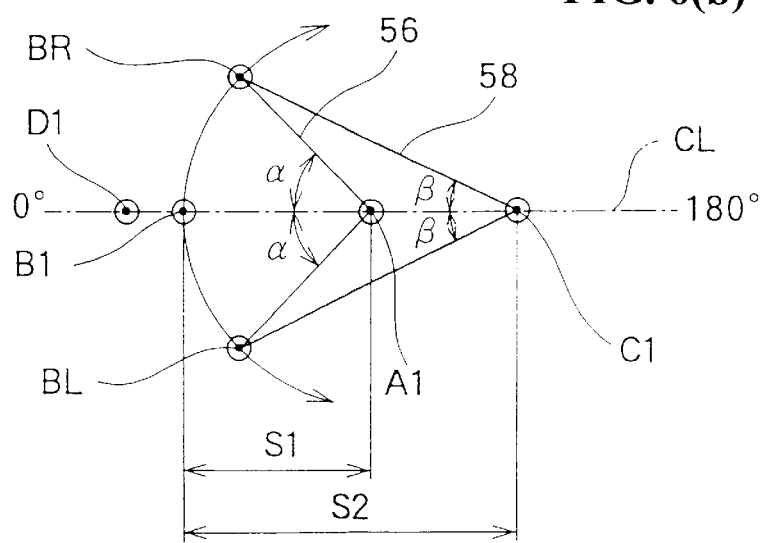

FIGS. 6(a) and 6(b) are block- and operation diagrams of the front wheel steering system according to the present invention. FIG. 6(a) is a left side view showing the portion around the link mechanism 53 in the front wheel steering system 50. The front wheel steering system 50 includes the following orientations (1) to (4) when viewed in the direction of the centerline A1 of the steering shaft 51, or in the direction of the arrow b.

(1). The center B1 of the universal coupling 59 is disposed at a position offset frontward by an amount S1 with respect to the centerline A1 of the steering shaft 51.

(2). The center C1 of the second connecting pin 57 is disposed at a position offset rearward by an amount S2 with respect to the center B1 of the universal coupling 59. The center C1 passes through the centerline of the steering stem 54. Therefore, C1 is also the centerline of the steering stem 54.

(3). The center D1 of the first connecting pin 55 is disposed at the position offset frontward by the amount S3 with respect to the centerline A1 of the steering shaft 51.

(4). The relation among the respective offset amounts S1, S2 and S3 are such that the offset amount S3 is set to a value larger than the offset amount S1. Furthermore, the offset amount S2 is set to a value larger than the offset amount S3. Accordingly, the formula S1<S3<S2 is true.

In addition, the front wheel steering system 50 is constructed in such a manner that, as shown in FIG. 6(a), the center D1 of the first connecting pin 55 is disposed below the steering shaft 51, the center C1 of the second connecting pin 57 is disposed below the center D1, and the center B1 of the universal coupling 59 is disposed below the center C1.

The centerline C1 of the steering stem 54 is not in parallel with the centerline A1. In other words, the steering stem 54 extends from the center C1 of the second connecting pin 57 toward the lower front, and simultaneously inclines slightly in a backward direction from the centerline A1.

Figure 7:
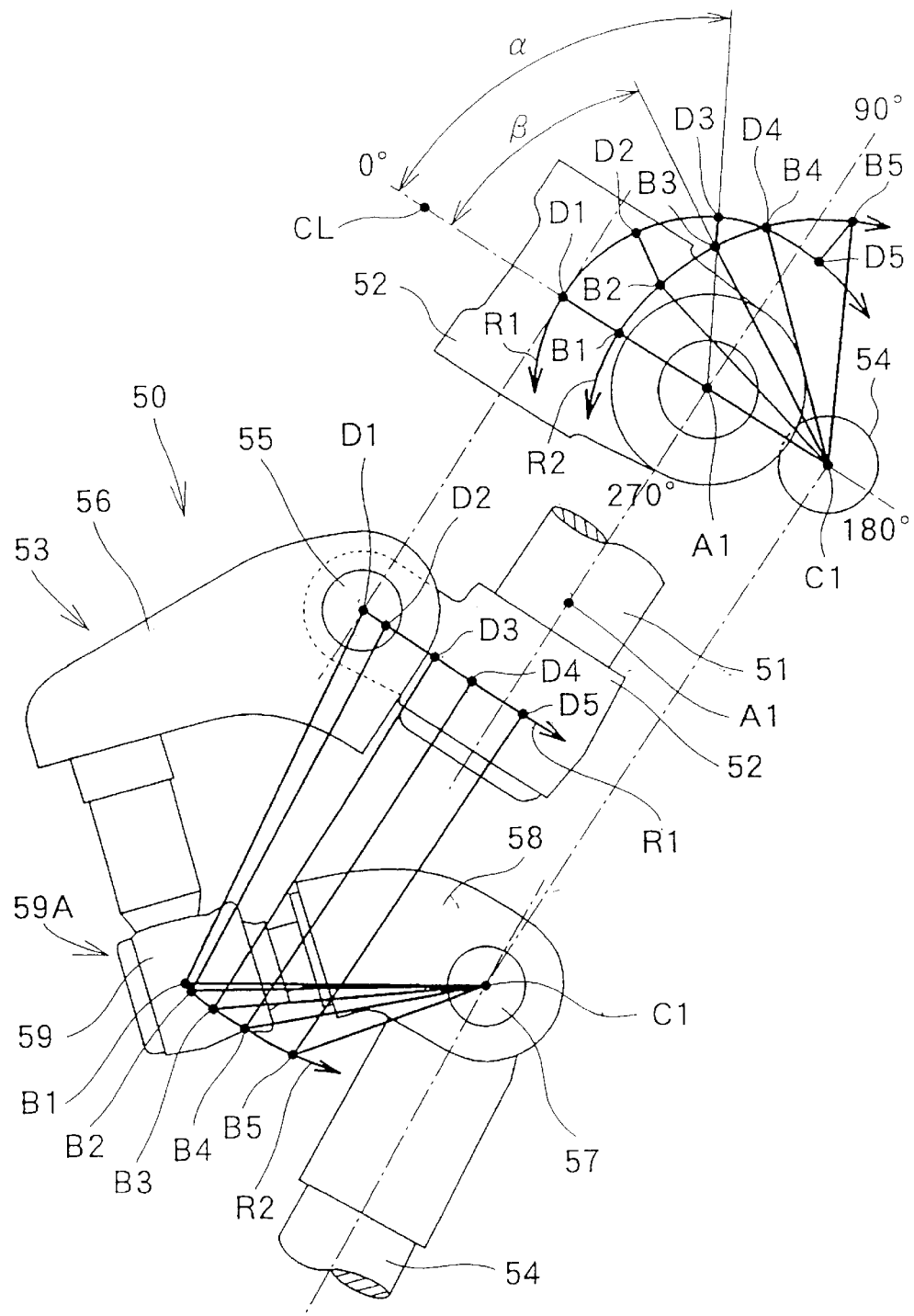
FIG. 7 is an operation drawing of the front wheel steering system according to the present invention (part 1)

FIG. 6(b) is a pattern diagram of the link mechanism 53 shown in FIG. 6(a) when viewed in the direction shown by the arrow b. In FIG. 6 and FIG. 7 that will be described later, the centerline A1 of the steering shaft 51 shown in the above described FIG. 6(a) is referred to as "point A1", the center B1 of the universal coupling 59 is referred to as "point B1", the center C1 of the second connecting pin 57 is referred to as "point C1", and the center D1 of the first connecting pin 55 is referred to as "point D1".

FIG. 6(b) illustrates that when the steering angle of the steering shaft 51 is zero, or in the neutral state, the point A1, the point B1, the point C1 and the point D1 are aligned on the center CL of the vehicle body.

The general operation of the front wheel steering system 50 will now be described. When the upper link 56 is turned rightward from the neutral state by an angle α by means of the steering shaft 51, the point B1 is displaced to the point BR. As a consequence, the lower link 58 and the steering stem 54 are rotated rightward about the point C1 by an angle β. When the upper link 56 is turned leftward by an angle α, the point B1 is displaced to the point BL. The lower link 58 and the steering stem 54 turn leftward about the point C1 by an angle β. The angle β is smaller than the angle α (α>β).

The precise and detailed operation of the front wheel steering system 50 will be described in conjunction with FIG. 7 below.

FIGS. 7(a) and 7(b) are operation drawings (part 1) of the front wheel steering system according to the present invention. FIG. 7(a) is a side view illustrating the area around the link mechanism 53. FIG. 7(b) is a plan view of FIG. 7(a) when viewed in the direction of the centerline A1 of the steering shaft 51.

When the steering angle of the steering shaft 51 is zero, or in the neutral state, the point A1, the point B1, the point C1, and the point D1 align on the center CL of the vehicle body shown in FIG. 7(b) (on the line passing through the angle 0° and 180°).

When the steering shaft 51 is turned clockwise in the figure from this neutral position, the center of the first connecting pin 55 moves along the swinging track R1 about the point A1 from the point D1 through the point D2, the point D3, and the point D4 to the point D5. Simultaneously, the center of the universal coupling 59 moves along the swinging track R2 from the point B1 through the point B2, the point B3, and the point B4 to the point B5. In other words, when the center of the first connecting pin 55 is displaced from the point D1 to the point D2, the center of the universal coupling 59 is displaced from the point B1 to the point B2. Likewise, when the center of the connecting pin 55 is displaced to the point D3, the center of the universal coupling 59 is displaced to the point B3, when the center of the connecting pin 55 is displaced to the point D4, the center of the universal coupling is displaced to the point B4, and when the center of the connecting pin 55 is displaced to the point D5, the center of the universal coupling 59 is displaced to the point B5.

For example, if the upper link 56 is turned (steered) clockwise in the figure from 0° by the angle of $\alpha$ by means of the steering shaft 51, the center of the first connecting pin 55 is displaced from the point D1 to the point D3. Simultaneously, the center of the universal coupling 59 is displaced from the point B1 to the point B3. As a consequence, the lower link 58 turns (rotates) together with the steering stem 54 by the angle of $\beta$ corresponding to the displacement from the point B1 to the point B3. The angle $\alpha$ is a steering angle of the steering shaft 51 and the angle $\beta$ is an angle of rotation of the steering stem 54.

Furthermore, when the steering angle of the steering shaft 51 is 180°, the angle of rotation of the steering stem 54 is also 180°.

Since the steering shaft 51 is disposed between the steering stem 54 and the universal coupling 59, the angle of rotation $\beta$ is smaller than the steering angle $\alpha$ ($\alpha > \beta$).

Therefore, the steering force applied by the steering shaft 51 is smaller than the case where the point A1 coincides with the point C1.

The proportion of the angle of rotation $\beta$ with respect to the steering angle $\alpha$, or the steering angle ratio, varies with the proportion X of the offset amount S2 (steering link ratio X) with respect to the offset amount S1 shown in FIG. 6.

As is already apparent, the respective swinging tracks R1, R2 shown in the FIG. 7(a) by the thick lines represent the projection of the swinging tracks R1, R2 shown in FIG. 7(b), respectively. In other words, when the front wheel steering system 50 is viewed from the side as in FIG. 7(a), the center of the universal coupling 59 is displaced along the swinging track R2 in accordance with the variation of the steering angle.

When the steering angle is 0°, the center of the universal coupling 59 resides on the position of the point B1 on the swinging track R2 in FIG. 7(a). The offset amount of the center of the universal coupling 59 with respect to the centerline A1 of the steering shaft 51 at this time is the maximum value S1 (See FIG. 6). Subsequently, the offset amount decreases with increase of the steering angle.

On the other hand, the offset amount of the center of the universal coupling 59 with respect to the point C1 is the maximum value S2 (See FIG. 6) when the steering angle is 0°. Subsequently, the offset amount decreases with increase of the steering angle. However, since the point C1 is arranged behind the centerline A1 of the steering shaft 51, the extent of reduction of the offset amount S2 in association with increase of the steering angle is smaller than the extent of reduction of the offset amount S1.

As a result, the proportion of the offset amount S2 with respect to the offset amount S1 increases with increase of the steering angle.

As is apparent from the description above, in FIG. 7(a), the proportion of the distance from the universal coupling 59 to the center of the steering stem 54 (the above-described offset amount S2) with respect to the distance from the centerline A1 of the steering shaft 51 to the universal coupling 59 (the above-described offset amount S1) varies in accordance with the steering angle of the steering shaft 51. As a consequence, the proportion of the steered angle of the front wheel with respect to the steering angle of the steering shaft 51 (steering angle ratio) varies in accordance with the steering angle of the steering shaft 51. In this way, the link mechanism 53 has a function to vary the steering angle ratio. Accordingly, this is called the steering angle ratio varying function. Since the mechanism providing the steering angle ratio varying function is the link mechanism 53, the structure is extremely simple.

Figure 8A:
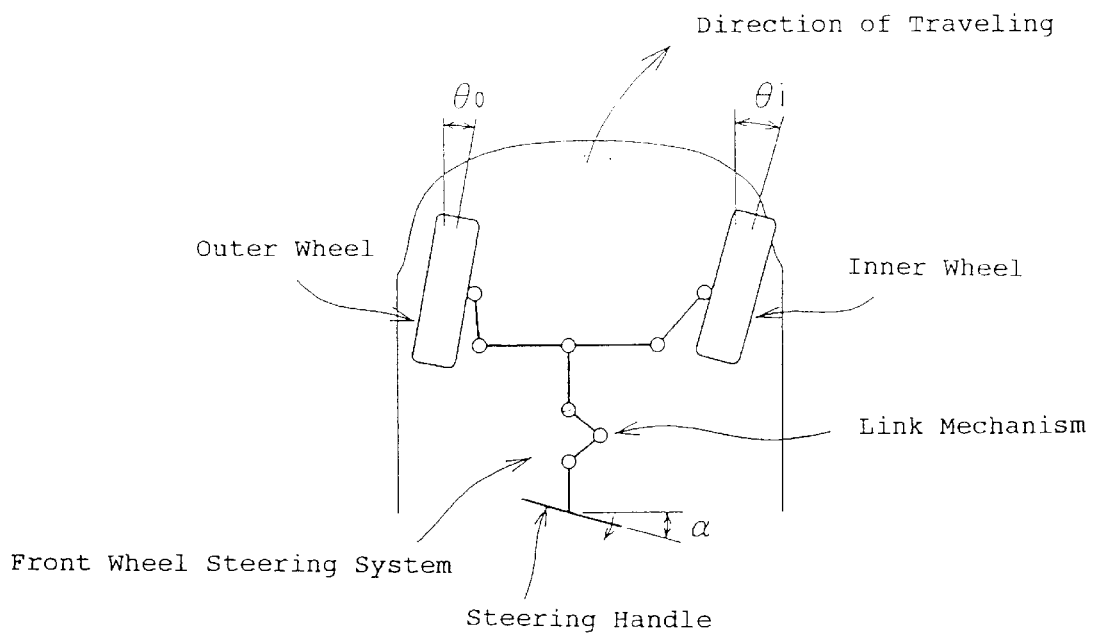
FIGS. 8(a) and 8(b) are operation drawings of the front wheel steering system according to the present invention (part 2)
Figure 8B:
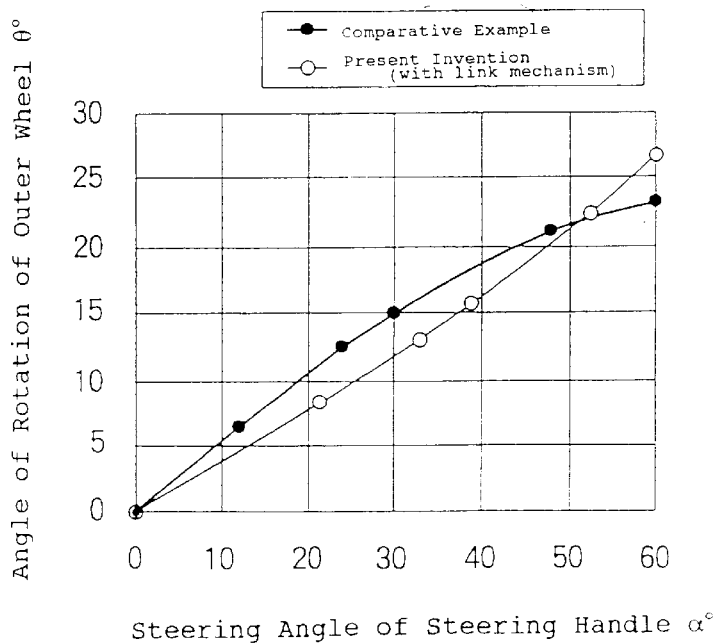

FIGS. 8(a) and 8(b) are operation drawings (part 2) of the front wheel steering system according to the present invention. FIG. 8(a) is a diagrammatic plan view of the front portion of the automotive four-wheeled vehicle showing a state in which the automotive four-wheeled vehicle is in a cornering operation. The angle of rotation of the front wheel on the outside when cornering (outer wheel) is $\theta$o and the angle of rotation of the front wheel on the inside when cornering (inner wheel) is $\theta$i when the steering angle of the bar-type steering handle is $\alpha$. Since Ackerman steering is employed in the front wheel steering system, the angle of rotation $\theta$o of the outer wheel is smaller than the angle of rotation $\theta$i of the inner wheel ($\theta$o<$\theta$i).

FIG. 8(b) is a steering angle ratio characteristic diagram for the front wheel steering system shown in FIG. 8(a). The horizontal axis in FIG. 8(b) represents the steering angle $\alpha$ of the steering handle, and the vertical axis represents the angle of rotation $\theta$o of the outer wheel.

In the FIG. 8(b), the thick line with solid dots is a steering angle ratio characteristic curve of a comparative example, which has a general non-linear characteristic when a link mechanism is not provided at the mid section of the steering shaft.

The thin line with hollow dots is a steering angle ratio characteristic curve of the present invention, which has a non-linear characteristic in the case where the steering stem is connected to the steering shaft via a link mechanism. However, the characteristic in the present invention shows the case where the steering link ratio X shown in FIGS. 6(a) and 6(b) above (X=S2/S1) is set to 1.8.

The steering angle ratio characteristic curve of the comparative example exhibits an upward sloping convex curve. The curve of the comparative example has a sharp inclination in the range where the steering angle $\alpha$ of the steering handle is approximately not more than 40°, and a slow inclination in the range over 40°.

On the other hand, the steering angle ratio characteristic curve of the present invention exhibits an upward sloping concave curve. The curve of the present invention has a slow inclination (gradual increase) in the range where the steering angle $\alpha$ of the steering handle is approximately not more than 40°, and a sharp inclination in the range over approximately 40°.

According to FIG. 8(b), when the steering angle $\alpha$ exceeds approximately 52°, the steering angle ratio characteristic curve of the present invention crosses over the steering angle ratio characteristic curve of the comparative example. In other words, the proportion St of the angle of rotation θo of the outer wheel with respect to the steering angle α of the steering handle (steering angle ratio St) is such that the case of the present invention is below the case of the comparative example in the range where the steering angle α is approximately not more than 52°, and exceeds the comparative example in the range over approximately 52°. As a consequence, the angle of rotation θo of the outer wheel when the steering angle α is not more than approximately 52° is smaller in the case of the present invention than in the case of the comparative example. Since the steering angle ratio St is smaller in the present invention, a steering force of the steering handle may be correspondingly smaller.

This point will be described more specifically. For example, when the outer wheel is rotated with the angle of rotation of θo=12°, the angle of rotation a of the comparative example is 22°, while the angle of rotation a of the present invention is 30°, which is larger than the case of the comparative example. In this way, in the ratio where the steering angle α is not more than approximately 52°, the steering angle α required to rotate the outer wheel with a certain angle of rotation θo is larger in the present invention than the comparative example. Therefore, a steering force of the steering handle may be smaller correspondingly in the present invention. Therefore, in the range where the steering angle α is not more than approximately 52°, a steering force of the steering handle for cornering the automotive four-wheeled vehicle may be reduced.

Accordingly, when the steering handle is in generally the neutral position, the proportion of the angle of rotation (θo, θi of the front wheel with respect to the steering angle α of the steering handle, in other word, the response of the handle can be relatively reduced. Accordingly, the sense of steering (feeling of steering) while driving the automotive four-wheeled vehicle straight ahead in the middle- and high-speed range is enhanced, thereby improving maneuverability. In addition, the steering force required to drive the automotive four-wheeled vehicle straight ahead in the middle- and high-speed range may be reduced in comparison with the comparative example.

On the other hand, in the range where the steering angle α exceeds approximately 52°, when the steering handle is steered by the steering angle α, the angle of rotation θo of the outer wheel is larger in the present invention than the case of the comparative example. Therefore, the turning radius of the automotive four-wheeled vehicle can be reduced in the present invention than in the case of the comparative example.

Employing the handle bar type steering handle of the present invention has the following advantages.

When allowing the automotive four-wheeled vehicle to advance straight ahead during normal driving in the city, the steering angle α of the bar-type steering handle may be approximately 0° to 10° to the right and left, respectively. In addition, the maximum steering angle α by which the driver generally steers the steering handle (the maximum steering angle) is not more than 50° to 60° to the right and left, respectively. The maximum steering angle is significantly smaller than the case where a steering wheel type handle is employed.

Therefore, the front wheel steering system of the present invention is specifically effective in the case where the steering handle of a handle bar type handle is used in the range where the maximum steering angle does not exceed 60° to the right and left, respectively, when considering the feeling of steering.

Figure 9:
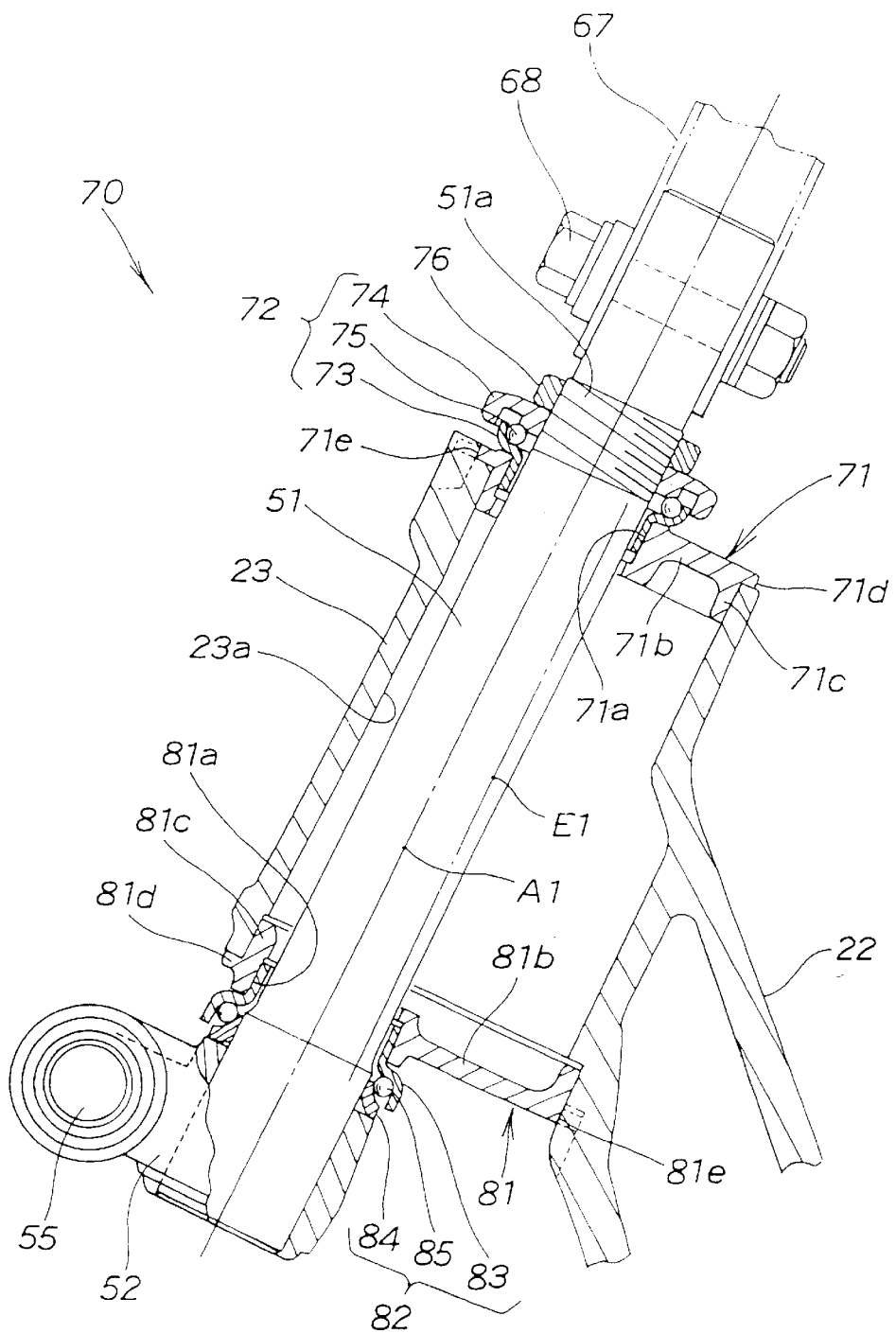
FIG. 9 is a cross-sectional view showing the region around a steering shaft and adjusting mechanism according to the present invention.

FIG. 9 is a cross-sectional view illustrating the region around the steering shaft and the adjusting mechanism according to the present invention.

The head pipe 23 comprises a through hole 23a in the vertical direction for allowing the steering shaft 51 to pass. The through hole 23a has a relatively large diameter in comparison with the diameter of the steering shaft 51 for enabling the centerline A1 of the steering shaft 51 to cross over the centerline E1 of the head pipe 23 at an arbitrary angle. For example, the through hole 23a is in the form of an elliptic hole elongated in the front and rear direction or of circular form having a larger diameter in comparison with the diameter of the steering shaft 51. The steering shaft 51 and the connecting member 52 are joined by press fitting the steering shaft 51 into the connecting member 52 and welding the lower end portion thereof.

The steering adjusting mechanism 70 is constructed in such a manner that a top plate 71 and a bottom plate 81 are replaceably mounted on the top and bottom of the head pipe 23. The steering shaft 51 is passed through the through hole 71a formed in the top plate 71 and the through hole 81a formed on the bottom plate 81 so as to be capable of rotation. The top plate 71 supports the steering shaft 51 via a first bearing 72 and a locking nut 76. The bottom plate 81 supports the steering shaft 51 via a second bearing 82.

More specifically, the top plate 71 comprises a body portion 71b having a through hole 71a, a fitting portion 71c for fitting into the through hole 23a of the head pipe 23, a flange 71d for abutting against the top end surface of the head pipe 23, and a positioning groove 71e for being positioned by hooking on the projection of the head pipe 23.

The first bearing 72 comprises an outer race 73 for fitting in the through hole 71a of the top plate 71, an inner race 74 for being screwed into the male screw 51a on the steering shaft 51, a number of balls 75 interposed between the outer and inner races 73, 74, and a retainer for retaining the balls 75, which is not shown in the figure. The inner race 74 also serves as the adjusting nut.

The bottom plate 81 comprises a body portion 81b having a through hole 81a, a fitting portion 81c for fitting into the through hole 23a on the head pipe 23, a flange 81d for abutting against the lower end surface of the head pipe 23, and a positioning groove 81e for being positioned by hooking on the projection of the head pipe 23.

The second bearing 82 comprises an outer race 83 for fitting in the through hole 81a of the bottom plate 81, an inner race 84 for fitting into the steering shaft 51, a number of balls 85 interposed between the outer and inner races 83, 84, and a retainer for retaining the balls 85, which is not shown in the figure.

As is apparent from the description above, the steering shaft 51 can be mounted to the head pipe 23 via the top and bottom plates 71, 81 and the first and second bearings 72, 82 so as to be capable of rotation. Reference numeral 68 is a mounting bolt for mounting the steering handle 67 to the upper end of the steering shaft 51.

FIG. 9 shows that the centerline A1 of the steering shaft 51 is arranged almost in parallel with, and forward of, the centerline E1 of the head pipe 23 (center of the through hole 23a). As a matter of course, the centers of the through holes 71a, 81a of the top and bottom plates 71, 81 mounted on top and at the bottom of the head pipe 23 coincide with the centerline A1 of the steering shaft 51.

Figure 10:
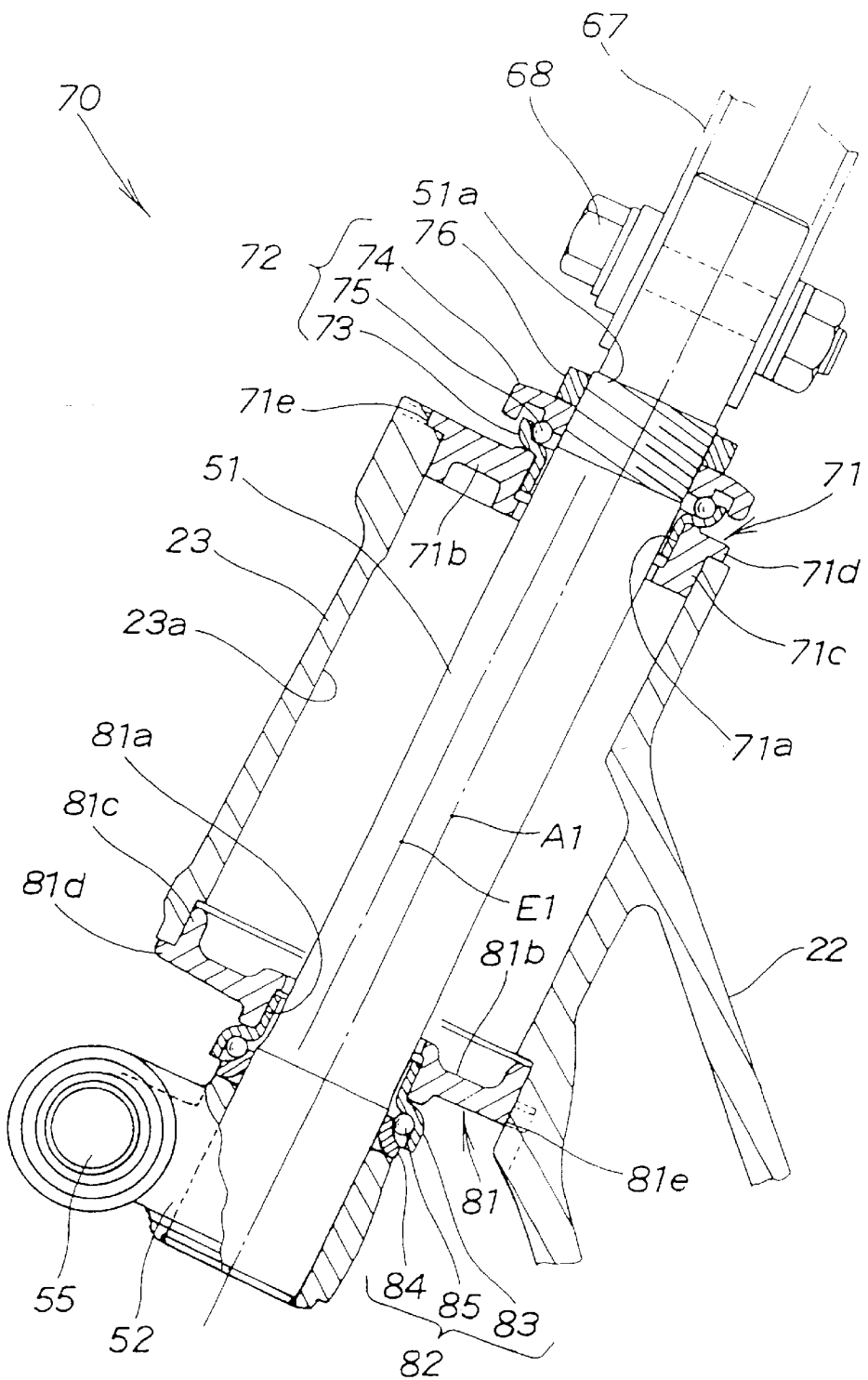
FIG. 10 is a drawing showing an example of mounting the steering shaft according to the present invention (part 1)

FIG. 10 is a drawing illustrating an example of mounting the steering shaft according to the present invention (part 1), in which the steering shaft 51 is mounted on the head pipe 23 with the centerline A1 of the steering shaft 51 arranged almost in parallel with, and rearward of, the centerline E1 of the head pipe 23.

The centers of the through holes 71a, 81a of the top and bottom plates 71, 81 mounted on the top and bottom of the head pipe 23 coincide with the centerline A1 of the steering shaft 51. By replacing the top and bottom plates 71, 81 shown in FIG. 9 with the top and bottom plates 71, 81 shown in FIG. 10, the position of the centerline A1 of the steering shaft 51 changes.

Figure 11:
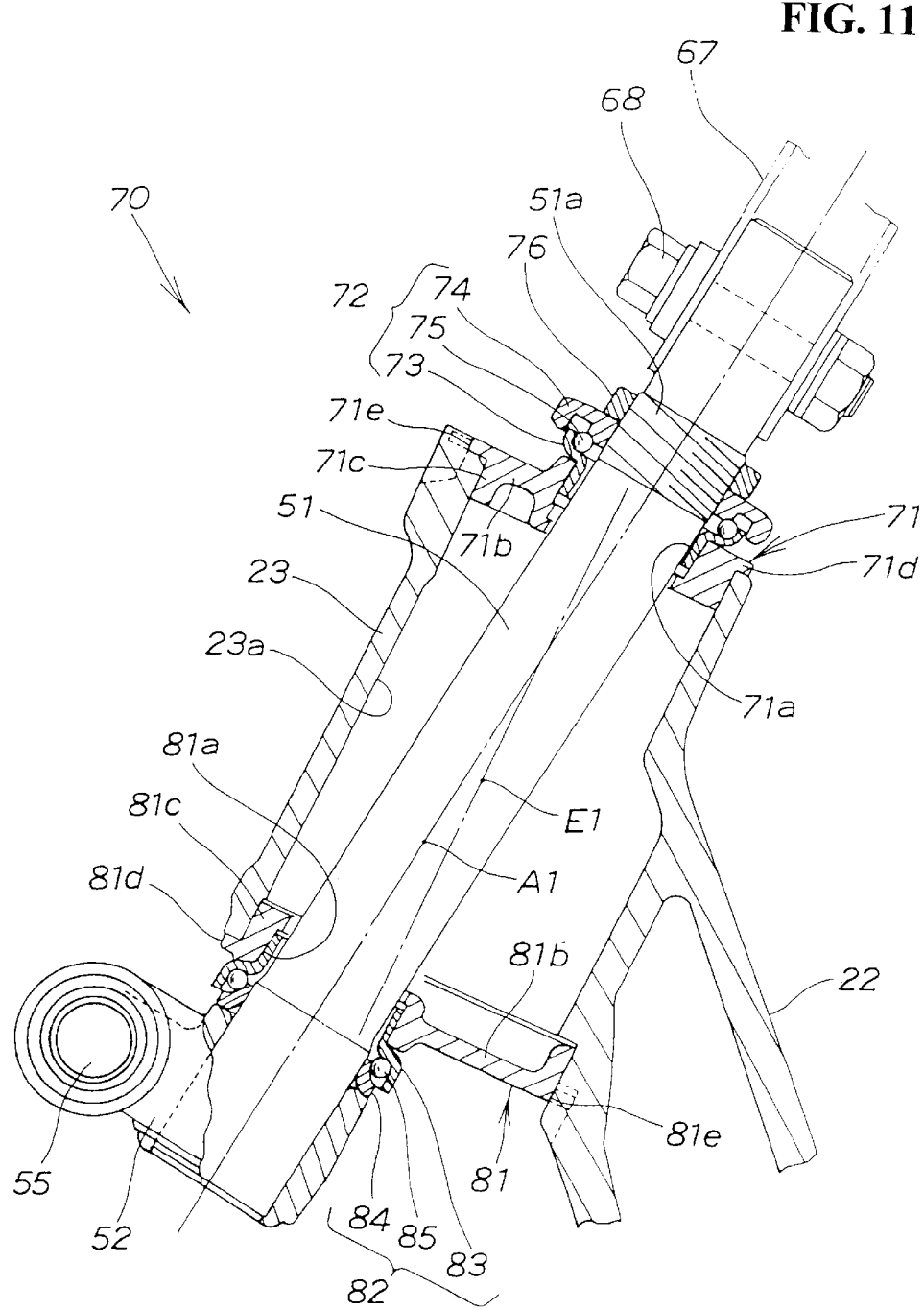
FIG. 11 is a drawing showing an example of mounting the steering shaft according to the present invention (part 2)

FIG. 11 is a drawing illustrating an example of mounting the steering shaft according to the present invention (part 2), in which the steering shaft 51 is mounted to the head pipe 23 with the centerline A1 of the steering shaft 51 crossed over the centerline E1 of the head pipe 23 in the forward direction so that the lower end of the steering shaft 51 is placed in front of the centerline E1 of the head pipe 23.

The centers of the through holes 71a, 81a of the top and bottom plates 71, 81 mounted on the top and bottom of the head pipe 23 coincide with the centerline A1 of the steering shaft 51. By replacing the top and bottom plates 71, 81 shown in FIG. 9 with the top and bottom plate 71, 81 shown in FIG. 11, the position of the centerline A1 of the steering shaft 51 changes.

Figure 12:
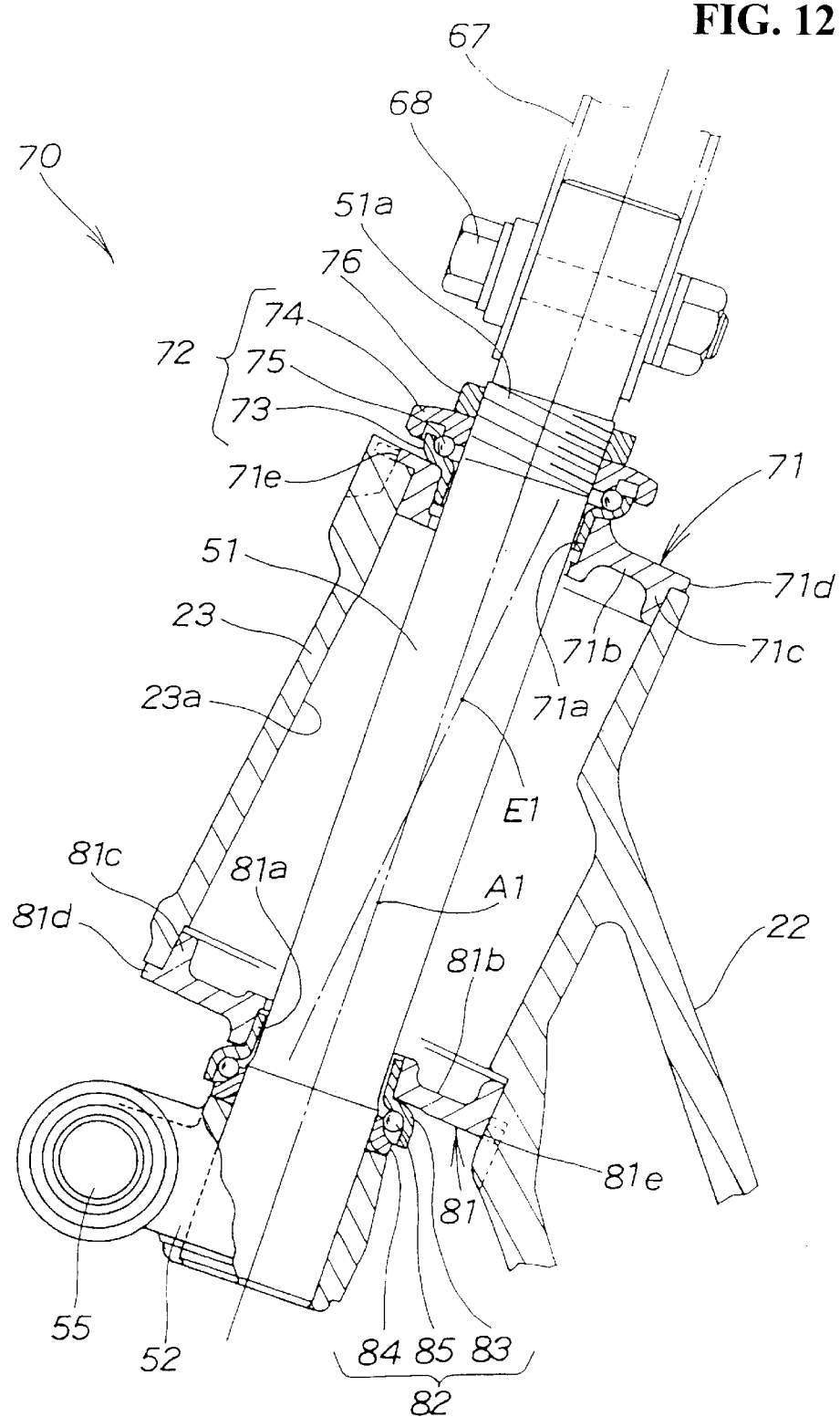
FIG. 12 is a drawing showing an example of mounting the steering shaft according to the present invention (part 3)

FIG. 12 is a drawing illustrating an example of mounting the steering shaft according to the present invention (part 3), in which the steering shaft 51 is mounted to the head pipe 23 with the centerline A1 of the steering shaft 51 crossed over the center line E1 of the head pipe 23 in the rearward direction so that the lower end of the steering shaft 51 is placed at the rear of the centerline E1 of the head pipe 23.

The centers of the through holes 71a, 81a of the top and bottom plates 71, 81 mounted on the top and bottom of the head pipe 23 coincide with the centerline A1 of the steering shaft 51. By replacing the top and the bottom plates 71, 81 shown in FIG. 9 with the top and bottom plates 71, 81 shown in FIG. 12, the position of the centerline A1 of the steering shaft 51 changes.

As is apparent from the description above, by replacing a plurality of top plates 71 and a plurality of bottom plates 81, the position or the angle of the centerline A1 of the steering shaft 51 with respect to the centerline E1 of the head pipe 23 can be changed arbitrarily. By varying the offset amount of the connecting portion 59A with respect to the centerline A1 of the steering shaft 51 shown in FIG. 3 described above by changing the position or the angle of the centerline A1, the proportion of the angle of rotation β with respect to the steering angle α may be set to an optimum value.

In this way, the centerline A1 of the steering shaft 51 can be set to an arbitrary position or angle by adjusting the steering adjusting mechanism 70 considering the optimal steering characteristics for an automotive four-wheeled vehicle 10.

In the embodiment of the present invention described above, the following modification may also be applied.

The front wheel steering system 50 it not limited to the front wheel steering system for automotive four-wheeled vehicles 10, but may be for automotive three-wheeled vehicles in which the right and left front wheels are steered. The front wheel steering system in such a case causes the same action as the front wheel steering system 50.

The steering handle 67 is not limited to a handle bar, but may be a steering wheel.

The steering stem 54 may be disposed in parallel with the steering shaft 51.

The steering shaft 51 must simply be disposed between the steering stem 54 and the universal coupling 59 when the link mechanism 53 is viewed in the direction of the axis of the steering shaft as shown in FIG. 6. Therefore, in addition to the case where the universal coupling 59 is disposed in front of the steering stem 54, the universal coupling 59 may be disposed behind, on the left, or on the right of the steering stem 54 and the steering shaft 51 is disposed between the steering stem 54 and the universal coupling 59. The setting of the offset amount S1 to S3 is arbitrary.

As shown in FIG. 6, the link mechanism 53 must simply be a link in a generally angular C-shape defined by the line combining the point D1 and the point B1, and the line combining the point B1 and the point C1. For example, the center D1 of the first connecting pin 55 may coincide with the centerline A1 of the steering shaft 51. The center B1 of the universal coupling 59 may be disposed below the center D1 of the first connecting pin 55 and above the center C1 of the second connecting pin 57.

As described above, the present invention has the advantages as follows.

The first aspect of the present invention may be constructed so that the link mechanism provides a steering angle ratio varying function by arranging the steering stem below the steering shaft offset from the steering shaft, connecting the steering stem to the steering shaft via the link mechanism, constructing the link mechanism of an upper link, a lower link, and an universal coupling connecting these upper and lower links so that the steering shaft is placed between the steering stem and the universal coupling when the link mechanism is viewed in the direction of axis of the steering shaft.

Therefore, the steering angle ratio varying means can be made into a significantly simple construction. Furthermore, it is unnecessary to store the steering angle ratio varying means in a case. Therefore, the cost for the front wheel steering system for automotive three- and four-wheeled vehicles may be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front wheel steering system for a vehicle, the vehicle having right and left front wheels mounted for steering the vehicle, said front wheel steering system comprising:
 a steering shaft for controlling the steering of the right and left front wheels, said steering shaft being rotatably mountable on a head pipe of a vehicle body frame of the vehicle;
 a steering stem, said steering stem being disposed below and offset from said steering shaft, said steering stem being connectable to the right and left front wheels via right and left tie rods and right and left knuckle arms of the vehicle, respectively;
 a link mechanism, said link mechanism connecting said steering stem to said steering shaft; said link mechanism including:
  an upper link;
  a lower link; and
  a universal coupling for coupling said upper link and the lower link; and
 said steering shaft is disposed between said steering stem and said universal coupling when said link mechanism is viewed in an axial direction of said steering shaft.

2. The front wheel steering system for a vehicle according to claim 1, wherein when said link mechanism is viewed in the axial direction of said steering shaft, when a steering angle of said steering shaft is zero, a center of said steering shaft, a center of said universal coupling and a center of said steering stem are aligned in a straight line.

3. The front wheel steering system for a vehicle according to claim 2, wherein a distance from said universal coupling to the center of said steering stem with respect to a distance from the center of said steering shaft to said universal coupling varies in accordance with said steering angle of said steering shaft.

4. The front wheel steering system for a vehicle according to claim 1, further comprising an adjusting mechanism for varying an offset amount between said steering shaft and said steering stem.

5. The front wheel steering system for a vehicle according to claim 4, wherein said adjusting mechanism comprises:
- a top plate having a through hole formed therein, said top plate being mountable to an upper portion of the head pipe;
- a bottom plate having a through hole formed therein, said bottom plate being mountable to a lower portion of the head pipe, said steering shaft being mounted for rotation within said through holes of said top and bottom plates; and
- wherein a center of each of said through holes with respect to a center of the head pipe is variable to vary the offset amount between said steering shaft and said steering stem.

6. The front wheel steering system for a vehicle according to claim 5, wherein the center of each of said through holes with respect to each other is variable to vary an angle of said steering shaft with respect to said steering stem.

7. A link mechanism for connecting a steering shaft to a steering stem of a vehicle, the vehicle having right and left front wheels mounted for steering the vehicle, the steering shaft for controlling the steering of the right and left front wheels, and a steering stem, the steering stem being disposed below and offset from the steering shaft, said link mechanism, comprising:
- an upper link;
- a lower link;
- a universal coupling for coupling said upper link and the lower link; and
- wherein the steering shaft is disposable between the steering stem and said universal coupling when said link mechanism is viewed in an axial direction of the steering shaft.

8. The link mechanism according to claim 7, wherein when said link mechanism is viewed in the axial direction of the steering shaft, when a steering angle of the steering shaft is zero, a center of the steering shaft, a center of said universal coupling and a center of the steering stem are aligned in a straight line.

9. The link mechanism according to claim 8, wherein a distance from said universal coupling to the center of the steering stem with respect to a distance from the center of the steering shaft to said universal coupling varies in accordance with the steering angle of the steering shaft.

10. A vehicle, comprising:
a body frame, said body frame including a head pipe;
right and left front wheels mounted to said body frame for steering; and
a front wheel steering system, said front wheel steering system including:
- a steering shaft for controlling the steering of said right and left front wheels, said steering shaft being rotatably mountable on said head pipe;
- a steering stem, said steering stem being disposed below and offset from said steering shaft, said steering stem being connected to said right and left front wheels via right and left tie rods and right and left knuckle arms, respectively;
- a link mechanism, said link mechanism connecting said steering stem to said steering shaft; said link mechanism including:
  - an upper link;
  - a lower link; and
  - a universal coupling for coupling said upper link and the lower link; and
- said steering shaft is disposed between said steering stem and said universal coupling when said link mechanism is viewed in an axial direction of said steering shaft.

11. The vehicle according to claim 10, wherein when said link mechanism is viewed in the axial direction of said steering shaft, when a steering angle of said steering shaft is zero, a center of said steering shaft, a center of said universal coupling and a center of said steering stem are aligned in a straight line.

12. The vehicle according to claim 11, wherein a distance from said universal coupling to the center of said steering stem with respect to a distance from the center of said steering shaft to said universal coupling varies in accordance with said steering angle of said steering shaft.

13. The vehicle according to claim 10, further comprising an adjusting mechanism for varying an offset amount between said steering shaft and said steering stem.

14. The vehicle according to claim 13, wherein said adjusting mechanism comprises:
- a top plate having a through hole formed therein, said top plate being mountable to an upper portion of the head pipe;
- a bottom plate having a through hole formed therein, said bottom plate being mountable to a lower portion of the head pipe, said steering shaft being mounted for rotation within said through holes of said top and bottom plates; and
- wherein a center of each of said through holes with respect to a center of the head pipe is variable to vary the offset amount between said steering shaft and said steering stem.

15. The vehicle according to claim 14, wherein the center of each of said through holes with respect to each other is variable to vary an angle of said steering shaft with respect to said steering stem.

* * * * *